(12) United States Patent
Weiner (10) Patent No.: US 7,190,489 B2
(45) Date of Patent: Mar. 13, 2007

(54) METHOD FOR PRINTING AN IMAGE IN TWO COLORS

(75) Inventor: Helmut Weiner, München (DE)

(73) Assignee: Oce Printing Systems GmbH, Poing (DE)

( * ) Notice: Subject to any disclaimer, the term of this patent is extended or adjusted under 35 U.S.C. 154(b) by 893 days.

(21) Appl. No.: 10/204,243

(22) PCT Filed: Feb. 13, 2001

(86) PCT No.: PCT/EP01/01586

§ 371 (c)(1),
(2), (4) Date: Oct. 21, 2002

(87) PCT Pub. No.: WO01/63909

PCT Pub. Date: Aug. 30, 2001

(65) Prior Publication Data

US 2003/0123070 A1     Jul. 3, 2003

(30) Foreign Application Priority Data

Feb. 23, 2000   (DE) ............................ 100 08 286

(51) Int. Cl.
  *H04N 1/405*   (2006.01)
(52) U.S. Cl. ........................ 358/3.06; 358/2.1
(58) Field of Classification Search ................ 358/1.9, 358/2.1, 3.06–3.1, 3.2, 3.21
See application file for complete search history.

(56) References Cited

U.S. PATENT DOCUMENTS

| 5,237,517 | A  |         | 8/1993  | Harrington et al. |
| 5,732,205 | A  |         | 3/1998  | Astle |
| 5,740,333 | A  |         | 4/1998  | Yoh et al. |
| 5,862,305 | A  |         | 1/1999  | Girmay et al. |
| 5,982,924 | A  |         | 11/1999 | Power et al. |
| 6,721,069 | B1 | *       | 4/2004  | Harrington ............. 358/3.2 |
| 2005/0157318 | A1 | *    | 7/2005  | Harrington ............. 358/1.9 |

FOREIGN PATENT DOCUMENTS

| DE | 40 25 793 C 2  | 2/1992 |
| DE | 194 47 200 A1  | 7/1996 |
| EP | 0 643 529 A2   | 3/1995 |
| EP | 0 643 529 A3   | 3/1995 |
| EP | 0 781 035 A2   | 6/1997 |

* cited by examiner

Primary Examiner—Thomas D. Lee
Assistant Examiner—Stephen Brinich
(74) Attorney, Agent, or Firm—Shiff Hardin LLP (57) ABSTRACT

A method of printing a highlight color image uses half-tone printing reference patterns for generating printing values for a print original image for a standard color and for generating printing values for a print original image for a highlight color. The information pertaining to the color values of the original image that are assigned to a standard color region or to a highlight color region is integrated into the half-tone printing reference patterns, whereby the printing of a highlight image is limited to a selection of the corresponding half-tone printing reference pattern and the acceptance of the printing value indicated in the half-tone printing reference pattern. Only one corresponding selection for determining the printing values for the standard color and for the highlight color is carried out for each image point.

11 Claims, 7 Drawing Sheets

| RF | R | G | B | RF | R | G | B | RF | R | G | B | RF | R | G | B | RF | R | G | B |
|---|---|---|---|---|---|---|---|---|---|---|---|---|---|---|---|---|---|---|---|
| | | | | 48 | 0 | 176 | 0 | 101 | 0 | 64 | 64 | 154 | 255 | 192 | 255 | 207 | 80 | 80 | 80 |
| | | | | 49 | 0 | 192 | 0 | 102 | 0 | 80 | 80 | 155 | 255 | 208 | 255 | 208 | 84 | 84 | 84 |
| | | | | 50 | 0 | 208 | 0 | 103 | 0 | 96 | 96 | 156 | 255 | 224 | 255 | 209 | 88 | 88 | 88 |
| | | | | 51 | 0 | 224 | 0 | 104 | 0 | 112 | 112 | 157 | 255 | 240 | 255 | 210 | 92 | 92 | 92 |
| | | | | 52 | 0 | 240 | 0 | 105 | 0 | 128 | 128 | 158 | 16 | 16 | 0 | 211 | 96 | 96 | 96 |
| 0 | 0 | 0 | 0 | 53 | 16 | 255 | 16 | 106 | 0 | 144 | 144 | 159 | 32 | 32 | 0 | 212 | 100 | 100 | 100 |
| 1 | 255 | 255 | 255 | 54 | 32 | 255 | 32 | 107 | 0 | 160 | 160 | 160 | 48 | 48 | 0 | 213 | 104 | 104 | 104 |
| 2 | 255 | 0 | 0 | 55 | 48 | 255 | 48 | 108 | 0 | 176 | 176 | 161 | 64 | 64 | 0 | 214 | 108 | 108 | 108 |
| 3 | 0 | 255 | 0 | 56 | 64 | 255 | 64 | 109 | 0 | 192 | 192 | 162 | 80 | 80 | 0 | 215 | 112 | 112 | 112 |
| 4 | 0 | 0 | 255 | 57 | 80 | 255 | 80 | 110 | 0 | 208 | 208 | 163 | 96 | 96 | 0 | 216 | 116 | 116 | 116 |
| 5 | 0 | 255 | 255 | 58 | 96 | 255 | 96 | 111 | 0 | 224 | 224 | 164 | 112 | 112 | 0 | 217 | 120 | 120 | 120 |
| 6 | 255 | 0 | 255 | 59 | 112 | 255 | 112 | 112 | 0 | 240 | 240 | 165 | 128 | 128 | 0 | 218 | 124 | 124 | 124 |
| 7 | 255 | 255 | 0 | 60 | 128 | 255 | 128 | 113 | 16 | 255 | 255 | 166 | 144 | 144 | 0 | 219 | 128 | 128 | 128 |
| 8 | 16 | 0 | 0 | 61 | 144 | 255 | 144 | 114 | 32 | 255 | 255 | 167 | 160 | 160 | 0 | 220 | 132 | 132 | 132 |
| 9 | 32 | 0 | 0 | 62 | 160 | 255 | 160 | 115 | 48 | 255 | 255 | 168 | 176 | 176 | 0 | 212 | 136 | 136 | 136 |
| 10 | 48 | 0 | 0 | 63 | 176 | 255 | 176 | 116 | 64 | 255 | 255 | 169 | 192 | 192 | 0 | 222 | 140 | 140 | 140 |
| 11 | 64 | 0 | 0 | 64 | 192 | 255 | 192 | 117 | 80 | 255 | 255 | 170 | 208 | 208 | 0 | 223 | 144 | 144 | 144 |
| 12 | 80 | 0 | 0 | 65 | 208 | 255 | 208 | 118 | 96 | 255 | 255 | 171 | 224 | 224 | 0 | 224 | 148 | 148 | 148 |
| 13 | 96 | 0 | 0 | 66 | 224 | 255 | 224 | 119 | 112 | 255 | 255 | 172 | 240 | 240 | 0 | 225 | 152 | 152 | 152 |
| 14 | 112 | 0 | 0 | 67 | 240 | 255 | 240 | 120 | 128 | 255 | 255 | 173 | 255 | 255 | 16 | 226 | 156 | 156 | 156 |
| 15 | 128 | 0 | 0 | 68 | 0 | 0 | 16 | 121 | 144 | 255 | 255 | 174 | 255 | 255 | 32 | 227 | 160 | 160 | 160 |
| 16 | 144 | 0 | 0 | 69 | 0 | 0 | 32 | 122 | 160 | 255 | 255 | 175 | 255 | 255 | 48 | 228 | 164 | 164 | 164 |
| 17 | 160 | 0 | 0 | 70 | 0 | 0 | 48 | 123 | 176 | 255 | 255 | 176 | 255 | 255 | 64 | 229 | 168 | 168 | 168 |
| 18 | 176 | 0 | 0 | 71 | 0 | 0 | 64 | 124 | 192 | 255 | 255 | 177 | 255 | 255 | 80 | 230 | 172 | 172 | 172 |
| 19 | 192 | 0 | 0 | 72 | 0 | 0 | 80 | 125 | 208 | 255 | 255 | 178 | 255 | 255 | 96 | 231 | 176 | 176 | 176 |
| 20 | 208 | 0 | 0 | 73 | 0 | 0 | 96 | 126 | 224 | 255 | 255 | 179 | 255 | 255 | 112 | 232 | 180 | 180 | 180 |
| 21 | 224 | 0 | 0 | 74 | 0 | 0 | 112 | 127 | 240 | 255 | 255 | 180 | 255 | 255 | 128 | 233 | 184 | 184 | 184 |
| 22 | 240 | 0 | 0 | 75 | 0 | 0 | 128 | 128 | 16 | 0 | 16 | 181 | 255 | 255 | 144 | 234 | 188 | 188 | 188 |
| 23 | 255 | 16 | 16 | 76 | 0 | 0 | 144 | 129 | 32 | 0 | 32 | 182 | 255 | 255 | 160 | 235 | 192 | 192 | 192 |
| 24 | 255 | 32 | 32 | 77 | 0 | 0 | 160 | 130 | 48 | 0 | 48 | 183 | 255 | 255 | 176 | 236 | 196 | 196 | 196 |
| 25 | 255 | 48 | 48 | 78 | 0 | 0 | 176 | 131 | 64 | 0 | 64 | 184 | 255 | 255 | 192 | 237 | 200 | 200 | 200 |
| 26 | 255 | 64 | 64 | 79 | 0 | 0 | 192 | 132 | 80 | 0 | 80 | 185 | 255 | 255 | 208 | 238 | 204 | 204 | 204 |
| 27 | 255 | 80 | 80 | 80 | 0 | 0 | 208 | 133 | 96 | 0 | 96 | 186 | 255 | 255 | 224 | 239 | 208 | 208 | 208 |
| 28 | 255 | 96 | 96 | 81 | 0 | 0 | 224 | 134 | 112 | 0 | 112 | 187 | 255 | 255 | 240 | 240 | 212 | 212 | 212 |
| 29 | 255 | 112 | 112 | 82 | 0 | 0 | 240 | 135 | 128 | 0 | 128 | 188 | 4 | 4 | 4 | 241 | 216 | 216 | 216 |
| 30 | 255 | 128 | 128 | 83 | 16 | 16 | 255 | 136 | 144 | 0 | 144 | 189 | 8 | 8 | 8 | 242 | 220 | 220 | 220 |
| 31 | 255 | 144 | 144 | 84 | 32 | 32 | 255 | 137 | 160 | 0 | 160 | 190 | 12 | 12 | 12 | 243 | 224 | 224 | 224 |
| 32 | 255 | 160 | 160 | 85 | 48 | 48 | 255 | 138 | 176 | 0 | 176 | 191 | 16 | 16 | 16 | 244 | 228 | 228 | 228 |
| 33 | 255 | 176 | 176 | 86 | 64 | 64 | 255 | 139 | 192 | 0 | 192 | 192 | 20 | 20 | 20 | 245 | 232 | 232 | 232 |
| 34 | 255 | 192 | 192 | 87 | 80 | 80 | 255 | 140 | 208 | 0 | 208 | 193 | 24 | 24 | 24 | 246 | 236 | 236 | 236 |
| 35 | 255 | 208 | 208 | 88 | 96 | 96 | 255 | 141 | 224 | 0 | 224 | 194 | 28 | 28 | 28 | 247 | 240 | 240 | 240 |
| 36 | 255 | 224 | 224 | 89 | 112 | 112 | 255 | 142 | 240 | 0 | 240 | 195 | 32 | 32 | 32 | 248 | 244 | 244 | 244 |
| 37 | 255 | 240 | 240 | 90 | 128 | 128 | 255 | 143 | 255 | 16 | 255 | 196 | 36 | 36 | 36 | 249 | 248 | 248 | 248 |
| 38 | 0 | 16 | 0 | 91 | 144 | 144 | 255 | 144 | 255 | 32 | 255 | 197 | 40 | 40 | 40 | 250 | 252 | 252 | 252 |
| 39 | 0 | 32 | 0 | 92 | 160 | 160 | 255 | 145 | 255 | 48 | 255 | 198 | 44 | 44 | 44 | | | | |
| 40 | 0 | 48 | 0 | 93 | 176 | 176 | 255 | 146 | 255 | 64 | 255 | 199 | 48 | 48 | 48 | | | | |
| 41 | 0 | 64 | 0 | 94 | 192 | 192 | 255 | 147 | 255 | 80 | 255 | 200 | 52 | 52 | 52 | | | | |
| 42 | 0 | 80 | 0 | 95 | 208 | 208 | 255 | 148 | 255 | 96 | 255 | 201 | 56 | 56 | 56 | | | | |
| 43 | 0 | 96 | 0 | 96 | 224 | 224 | 255 | 149 | 255 | 112 | 255 | 202 | 60 | 60 | 60 | | | | |
| 44 | 0 | 112 | 0 | 97 | 240 | 240 | 255 | 150 | 255 | 128 | 255 | 203 | 64 | 64 | 64 | | | | |
| 45 | 0 | 128 | 0 | 98 | 0 | 16 | 16 | 151 | 255 | 144 | 255 | 204 | 68 | 68 | 68 | | | | |
| 46 | 0 | 144 | 0 | 99 | 0 | 32 | 32 | 152 | 255 | 160 | 255 | 205 | 72 | 72 | 72 | | | | |
| 47 | 0 | 160 | 0 | 100 | 0 | 48 | 48 | 153 | 255 | 176 | 255 | 206 | 76 | 76 | 76 | | | | |

METHOD FOR PRINTING AN IMAGE IN TWO COLORS

BACKGROUND OF THE INVENTION

1. Field of the Invention

The present invention is directed to a method for printing an image in two colors.

2. Description of the Related Art

Such print images are also called highlight color images or, in short form, HLC images. The printing thereby ensues according to image data such that each image datum describes a color value of a picture element of a master image, and the color values of specific standard color regions are allocated to a standard color to be printed, and the color values of specific HLC color regions are allocated to an HLC color to be printed. The standard color and the HLC color are printed according to the color saturation of the colors of the master image allocated to the standard color or, respectively, to the HLC color.

In highlight color printing, a standard color and an HLC color are printed in different brightness levels or, respectively, color saturation values. As a rule, the standard color is black and is printed in different gray levels.

Highlight color printing is significantly more cost-beneficial than full-color printing with four primary colors (which is referred to as four-color printing), whereby the greatest variety of colors can be achieved by superimposed printing of the primary colors cyan, magenta, yellow and black. What is disadvantageous about four-color printing is that the luminosity of the colors that can be printed is limited despite the variety of colors. Particularly in the areas of red, green and blue, a luminosity level required by a client and especially a customized special color can often not be achieved in four-color printing.

Since only a specific color is often desired, it is significantly better for such applications to employ specific inks that exhibit the desired color when they are printed on widely distributed areas of the paper.

A known method for printing and HLC image comprises the following steps:

a) The master image is described by image data, whereby each image datum indicates the color value of a picture element. These color values are usually composed of three individual values for the colors red, green and blue. Each individual value is represented by a byte. Groups of similar color values are allocated to a reduced color value that is represented by a single byte. As a result thereof, the quantity of data of the image data of a master image is reduced to one-third.

b) The master image described with the reduced color values is converted into a print master image for the standard color that contains the color saturation values of the standard color for each picture element. These color saturation values are usually represented by a respective byte. Given the standard color black, the color saturation values represent the gray level. In the determination of the print master image, each picture element of the master image is examined to see whether the reduced color value thereof lies in the region of a standard color region that is allocated to the standard color to be printed and, when this is the case, the corresponding color saturation value is determined for this reduced color value and is stored in the print master image. The determination of the color saturation value usually ensues with pallets, i.e. tables, wherein the corresponding color saturation values are respectively allocated to the reduced color values.

c) The master image described with the reduced color values is converted into a print master image for the HLC color that contains the color saturation values of the HLC for each picture element. These color saturation values are usually represented by one byte. In the determination of the print master image, however, each picture element of the master image is investigated to see whether the reduced color value thereof lies in the range of a HLC color region that is allocated to the HLC color to be printed, and, when this is the case, the corresponding color saturation value is determined for this reduced color value and is stored in the print master image. The determination of the color saturation value likewise ensues with pallets as in the case of the standard color.

d) Since digital printers can usually only print color in two degrees of color saturation (no color or, respectively, full color saturation) or only in a very few color saturation levels, the master print image for the standard color and the master print image for the HLC color is converted into a rastered image with a dither method, this raster image being described with half-tone values.

The publication "Das Druckerbuch, Technik und Technologien der OPS-Hochleistungsdrucker, Drucktechnologien," Addition 4a, May 1999, ISBN 3-00-001019-X, Chapter 2.2 yields a dithering method wherein an image is scanned point-by-point with the resolution to be printed and is compared to the thresholds of what is referred to a dither matrix. When the color saturation values of the scanned image are higher than the thresholds, then the half-tone value 1 is set at the corresponding location in the master print image. When the color saturation value is lower than the threshold, then the half-tone value 0 is set in the master print image. At the printer, the color to be printed is printed only at the locations or, respectively, output pixels whose half-tone value is equal to 1.

With this known dithering method, master print images can be generated for digital printers that resolve a master image into a raster that, due to the limited resolution capabilities of the eye, appears to a viewer of the print master image as an image having different color saturation regions, even though the individual printing points have either full color saturation or no color saturation. Such a color saturation level generated by a raster is referred to as half-tone.

What is referred to as a multi-level dither method has been developed for printers that can print the individual output pixels in different color saturation levels, this being disclosed, for example, by German Patent Document DE 40 25 793 C2. A similar method is disclosed in the publication "Multi-Level Halftoning, Paul A. Delabastita, Agfa-Gevaert N. V., IS&T-S Fourth Technical Symposium on Prepress, Proofing & Printing (1995)", pages 68–73. These multi-level dithering methods are utilized given printers that can print an output pixel in a plurality of brightness levels. Given the exemplary embodiment disclosed by the German Patent Document DE 40 25 793 C2, the printer can print in six half-tone levels (see FIG. 5 of DE 40 25 793 C2). Accordingly, a master image described with color values is converted into a print master image described by print values, whereby the individual print values can assume different values (for example, six different values) that correspond to the brightness of the output pixels to be printed. This number of printing values cannot be generated with a single dither matrix; rather, a table having half-tone printing reference patterns is employed, whereby each half-tone printing reference pattern contains the print values of a printing raster that, when printed, represents a specific half-tone or, respectively, brightness value. In the known method, a half-tone printing reference pattern whose half-tone value corresponds to the color value of the printing point is selected based on the measure of the color value of the individual printing point. Printing values, i.e. the value that indicates the intensity with which an output pixel is to be printed with the printer, are arranged in a two-dimensional raster in the half-tone printing reference pattern, whereby each raster point is allocated to a specific picture element. The print value of the raster point corresponding to the picture element is taken from the half-tone printing reference pattern and is stored at the location of the respective picture element in the master print image. In this way, a master print image can be generated wherein a plurality of brightness levels of the individual color values are converted with a half-tone raster onto output pixels having a few brightness levels. The table with the half-tone printing reference patterns is employed instead of the dither matrix when the output pixels are to be printed with different brightness levels (multi-level), since the color value or, respectively, brightness value of a master image can only be converted with the known dither matrix onto digital output pixels (by-level) that have either full color saturation or no color saturation.

These known dithering methods have hitherto been utilized only for rastering a quasi-analog master image into a bi-level or, respectively, multi-level master print image.

European Patent Document EP-A2-0 781 035 discloses a method for producing highlight color copies from a multi-color original. In general, known method are employed for generating the HLC image. One special characteristic of the method is that the master image is automatically segmented, whereby different imaging methods can be employed for imaging the individual segments onto the HLC image.

U.S. Pat. No. 5,237,517 is directed to a method for imaging a color image onto a HLC image, whereby the color space of the HLC image is represented by a planar, triangular color space. The three corners of this color space represent the colors white, black and the fully saturated HLC color. In order to be able to image a specific hue of the chromatic master image onto the HLC image, that point in the color space of the HLC color is determined that corresponds to the fully saturated hue of the hue to be imaged. Together with the points for the colors black and white, this point in turn establishes a triangular sub-color space that represents a sub-set of the color space of the HLC color. The corresponding saturation levels of this hue are imaged onto this sub-color space.

U.S. Pat. No. 5,862,305 discloses a method for converting a plurality of input rasterings into a common output rastering. This method is particularly suited for highlight color systems, whereby the highlight color data for each color plane are separately processed and are subsequently merged.

U.S. Pat. No. 5,982,924 discloses a method for imaging a color image onto a two color image that allows the user to select the two colors onto which a color image is to be imaged.

German Patent Document DE-A1-195 47 200 discloses a method for generating an image with an accent color. The scanned master image is thereby examined with respect to bright or unsaturated color regions or saturated color regions. The saturated color regions are represented with a dark or saturated color and the bright color regions are represented with a second, bright color.

SUMMARY OF THE INVENTION

The present invention provides a simple method for printing an HLC image that can be implemented with less calculating outlay than methods previously known for printing an HLC image and, therefore, can be more quickly implemented.

This is achieved by a method for printing an HLC image (highlight color image) according to image data, where each image datum describes a color value of a picture element of a master image, and the color values of specific standard color regions are allocated to a standard color to be printed and the color values of specific HLC color regions are allocated to an HLC color to be printed, the following steps being implemented for determining printing values for driving a printer for each and every picture element to be printed:

a) producing half-tone printing reference patterns for the standard color and the HLC color from half-tone printing reference basic patterns, where a table having half-tone printing reference basic patterns for the standard color region and a further table with half-tone printing reference basic patterns for the HLC color region are provided, aa) a half-tone printing reference basic pattern for the standard color as well as a half-tone printing reference basic pattern for the HLC color from the table for the standard color is allocated to each color value allocated to the standard color, ab) a half-tone printing reference basic pattern for the standard color as well as a half-tone printing reference basic pattern for the HLC color from the table for the HLC color is allocated to each color value allocated to the HLC color as a respective half-tone printing reference pattern;

b) selection of a half-tone printing reference pattern for the respective picture element for the standard color, where the half-tone printing reference pattern is being selected according to the criterion of the color value of the respective picture element;

c) selection of a half-tone printing reference pattern for the respective picture element for the HLC color, whereby the half-tone printing reference pattern is selected according to the criterion of the color value of the respective picture element;

d) determining a printing value for the standard color and a printing value for the HLC color for the respective picture element from the corresponding half-tone printing reference pattern and storing the printing values at the location of the picture elements in a print master image for the standard color and in a print master image for the HLC color; and e) the print master images are transmitted to a printer device for printing the standard color and for printing the HLC color.

BRIEF DESCRIPTION OF THE DRAWINGS

The invention is explained in greater detail below and by way of example on the basis of the drawings.

FIG. 4 is a table that shows the relationship between reduced color values and RGB color values;

DETAILED DESCRIPTION OF THE PREFERRED EMBODIMENTS

According to developments of the inventive method, an HLC image (highlight color image) is printed according to image data, whereby each image datum describes a color value of a picture element of a master image, and the color values of specific standard color regions are allocated to a standard color to be printed and the color values of specific HLC color regions are allocated to an HLC color to be printed, whereby the following steps are initially implemented for determining the printing values for each and every picture element to be printed:

producing half-tone printing reference patterns for the standard color and the HLC color from half-tone printing reference basic patterns, whereby a table having half-tone printing reference basic patterns for the standard color region and a further table with half-tone printing reference basic patterns for the standard color region and a further table with half-tone printing reference basic patterns for the HLC color region are provided, and a half-tone printing reference basic pattern for the standard color as well as a half-tone printing reference basic pattern for the HLC color from the table for the standard color is allocated to each color value allocated to the standard color, and a half-tone printing reference basic pattern for the standard color as well as a half-tone printing reference basic pattern for the HLC color from the table for the HLC color is allocated to each color value allocated to the HLC color as a respective half-tone printing reference pattern;

selection of a half-tone printing reference pattern for the respective picture element for the standard color, whereby the half-tone printing reference pattern is selected according to the criterion of the color value of the respective picture element;

selection of a half-tone printing reference pattern for the respective picture element for the HLC color, whereby the half-tone printing reference pattern is selected according to the criterion of the color value of the respective picture element;

determining a printing value for the standard color and a printing value for the HLC color for the respective picture element from the corresponding half-tone printing reference pattern and storing the printing values at the location of the picture elements in a print master image for the standard color and in a print master image for the HLC color; and transferring the print master images to a printer device for printing the standard color and for printing the HLC color.

In the inventive method, half-tone printing reference patterns from half-tone printing reference basic patterns are combined that are provided either for printing the standard color or for printing the HLC color. The half-tone printing reference patterns thus contain not only known dithering information but also the information for the selection of the standard color region that is allocated to the standard color to be printed and the information for the selection of the HLC color region that is allocated to the HLC color to be printed. With the invention, thus, dither information are linked to highlight color information. By selecting the corresponding half-tone printing reference pattern, thus, the determination of the printing values can ensue solely according to the criterion of the color value of the respective picture element of the master image. No additional processing events are needed for integrating the HLC information, as is the case given the methods of the prior art. The determination of the printing values is reduced as a result of the inventive method merely to the selection of the printing values for the standard color and the HLC color of the half-tone printing reference pattern corresponding to the color value.

In a preferred embodiment of the inventive method, the half-tone printing reference patterns for the standard color and for the HLC color are combined to form combined half-tone printing reference patterns, whereby each position of the half tone printing reference pattern has a printing value for the standard color and a printing value for the HLC color allocated to it. As a result thereof, both the printing value for the standard color as well as the printing value for the HLC color are determined with a single selection.

Preferably, the half-tone printing reference pattern for the standard color has a different screen angle than the half-tone printing reference pattern for the HLC color. As a result thereof, what are referred to as Moiré effects are prevented, these being capable of being elicited by the structure of the raster.

Figure 1:
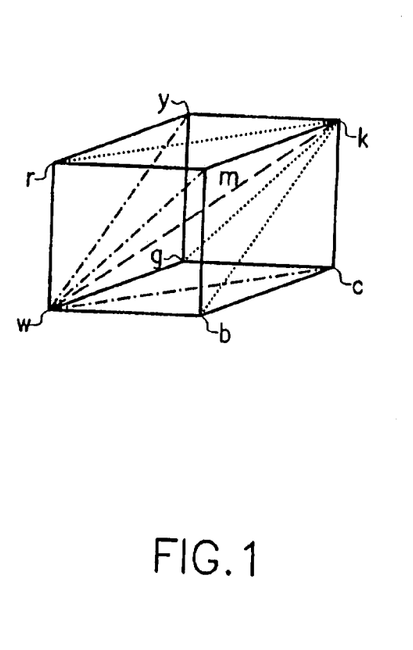
FIG. 1 shows a cube for illustrating the RGB color space having the colors w=white, k=black, r=red, g=green, b=blue, c=cyan, m=magenta and y=yellow.

FIG. 1 shows a cube for representing the RGB (Red, Green, Blue) color space. The corners of the cube represent the following colors:

w=white
k=black
r=red
g=green
b=blue
c=cyan
m=magenta
y=yellow

All colors of the cube can be presented by additive mixing of the three primary colors red, green and blue. The gray levels lie on the diagonal shown as a broken line from white to black.

Since the colors of the RGB color space can be represented by the three primary colors red, green and blue, it is standard to represent a RGB color with three bytes, whereby each byte indicates the color saturation of one of the three colors red, green and blue. The values for the individual primary colors red, green and blue can assume a value between 0 and 255, whereby the value 0 denotes a full color saturation and the value 255 denotes no color saturation with the corresponding primary color.

Figure 2:
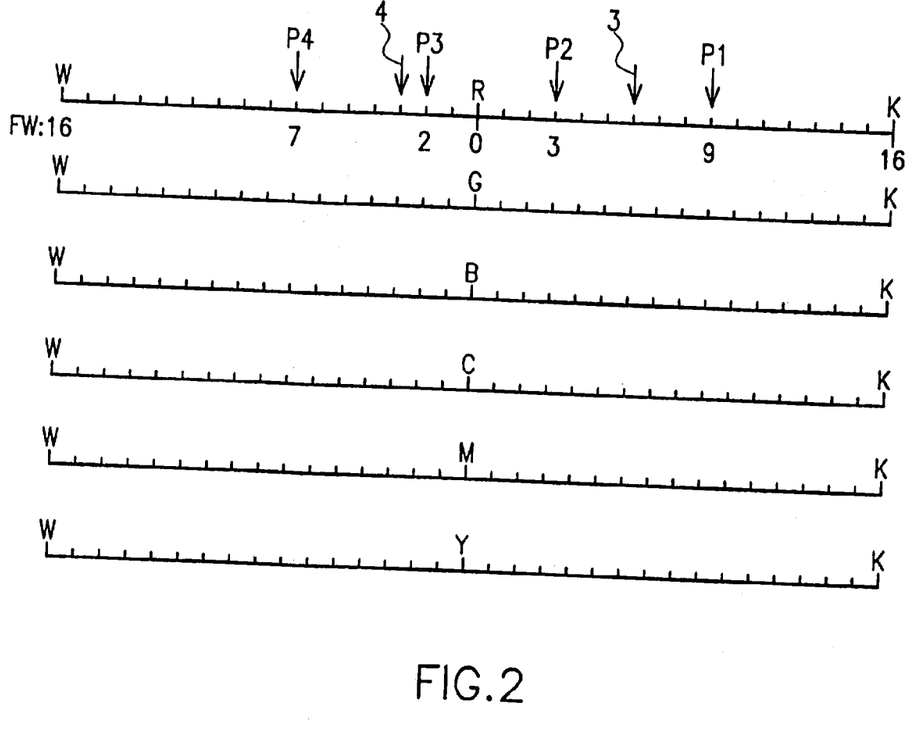
FIG. 2 shows a series of scales of color regions along the edges of the cube and diagonals of the lateral surfaces of the cube from FIG. 1 from white to black via red, green, blue, cyan, magenta, yellow.

FIG. 2 schematically shows the color scales of white to one of the colors red, green, blue, cyan, magenta and yellow and from the latter to black. Thus, the uppermost line in FIG.

2 shows the color curve from white to red and from red to black that proceeds—in the cube from FIG. 1—along the edge lines from white to red and along the diagonal of the upwardly directed surface of the cube from red to black. The color curves from white to green and from green to black or, respectively, from white to blue and from blue to black proceed in a corresponding way along the cube edges and then via the corresponding diagonals. The color curves from white to cyan, magenta or, respectively, yellow initially proceed via the diagonal entered as a dot-dashed line and from the latter along the corresponding cube edge to black.

Since the description of a master image with RGB color values causes an enormous storage requirement since each color value is represented by three bytes (which equals 24 bits), a reduced color value is provided that is described with only a single byte. For example, fifteen color saturation levels are respectively introduced between the fully saturated color white and the fully saturated color red and between the fully saturated color red and the fully saturated color black, the color saturation levels being uniformly spaced on the color curve from white to red or, respectively, from red to black (see FIG. 2) and therefore representing color saturation levels having the respectively same brightness spacing. Corresponding, reduced color values RF are introduced for the color curves from white to green, blue, cyan, magenta or, respectively, yellow and for the color curves from green, blue, cyan, magenta or, respectively, yellow to black, whereby respectively fifteen color saturation levels are provided.

FIG. 4 shows a table that shows an allocation of the color saturation levels in FIG. 2 indicated for the respective RGB color values to the reduced color values RF. The reduced color values 0 through 7 are allocated to the fully saturated colors, black, white, red, green, blue, cyan, magenta and yellow. The reduced color values 8 through 37 correspond to the color curve from white toward red to black, whereby the fully saturated colors are not recited again therein. In a corresponding way, the color curves for green covers the region of the reduced color values RF from 38 through 67, those for blue from 68 through 97, for cyan from 98 to 127, from magenta from 128 through 157 and for yellow from 158 through 187. 63 gray levels that are arranged at a uniform spacing along the diagonal in the cube from FIG. 1 leading from white to black are allocated to the reduced color values from 188 through 250.

The allocation of all RGB color values of a master image to the reduced color values ensues in that an arbitrary RGB color value F (r, g, b) is allocated to the reduced color value RF (rr, rg, rb) that is closest in Euclidean terms. This means that the term $((r-rr)^2+(g-rg)^2+(b-rb)^2)^{1/2}$ is minimal in the allocation of a predetermined RGB color value.

Figure 3:
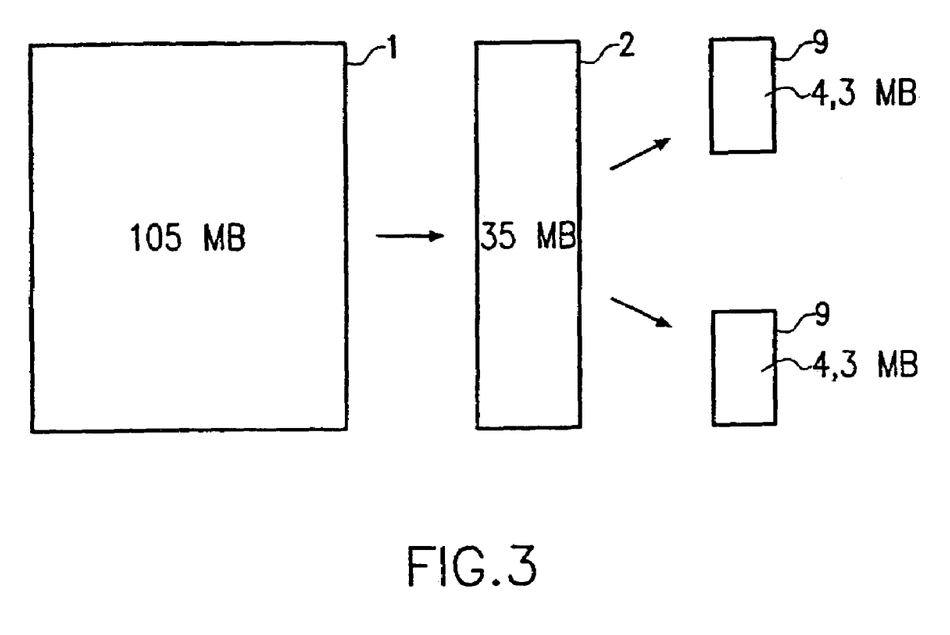
FIG. 3 is a block diagram showing schematically the conversion of a master image into a print master image for a standard color and a print master image for an HLC color.

As a result of this allocation, a master image 1 (FIG. 3) described in the RGB color space that, for example, has a data scope of 105 MB can be reduced to a data scope of 35 MB, since each picture element BP is described with a number that is only 8 bits in size instead of being described with a number that is 24 bits in size. A master image 2 described with reduced color values can be processed significantly faster than the master image described with the RGB colors.

As was initially set forth, of the color regions, there are the standard color regions that are allocated to the standard color, which is usually black, in HLC printing and other color printing, there are the HLC color regions that are allocated to the HLC color. This allocation means that the color values that are allocated either the standard color or to the HLC color are printed in the standard color or in the HLC color with a color saturation corresponding to the color value.

In the present exemplary embodiment, the user can respectively place two selection marks 3 and 4 at the color curves shown in FIG. 2, whereby the region between the marks represents the HLC color region allocated to the HLC color and the regions from white up to the selection mark 3 or, respectively, from the selection mark 4 up to black represent the standard color regions allocated to the standard color. The user can make a corresponding selection in all color curves for red, green, blue, cyan, magenta and yellow or can make a selection only in a few color curves or in a single color curve. When no selection is undertaken in one of the color curves, then these color curves are allocated to the standard color and therefore form a constituent part of the standard color region.

The method for printing an HLC image according to the present exemplary embodiment is fashioned for implementation at a digital printer that either prints an output pixel with full color saturation of the standard color or of the HLC color or does not print it. Such printers have no possibility of printing an output pixel in different degrees of color saturation, i.e. with different brightness values, for which reasons printing values for driving the corresponding printing points of the printer can only assume the values 0 (no printing) and 1 (printing). Since the resolution of standard printers is significantly higher than that of the human eye, raster structures can be printed with a screen width that lies below the perception threshold of the human eye, so that the raster structures are perceived as half-tone, i.e. that such rasters appear to a human as color with a color saturation degree that lies between no color saturation and full color saturation. Half-tone printing reference patterns are employed for graduation of these degrees of color saturation. FIGS. 7a through 7e show excerpts from such half-tone printing reference patterns. These half-tone printing reference patterns 5 are two-dimensional fields, whereby the individual field elements 6 represent printing values that can assume the values 0 and 1. The printing value 0 denotes that the printing point allocated to this position of the field is not printed by the printer, and the printing value 1 denotes that the corresponding printing value is printed. In a half-tone printing reference pattern that comprises only printing values having the value 0, consequently, no printing is implemented, and, given a half-tone printing reference pattern wherein all printing values are equal to 1, a printing in the full color saturation is implemented over the entire area to be printed. The higher the color saturation to be printed, the more printing values of the half-tone printing reference pattern must assume the value 1.

The half-tone printing reference patterns shown in FIGS. 7a through 7d allow a graduation of the color saturation in to thirty-three levels. Accordingly, half-tone values in the range from 0 through 32 are allocated to this half-tone printing reference pattern, whereby the pattern shown in FIG. 7a has the half-tone value 1, the pattern shown in FIG. 7b has the half-tone value 2, the pattern shown in FIG. 7c has the half-tone value 7, the pattern shown in FIG. 7d has the half-tone value 11, and the pattern shown in FIG. 7e has the half-tone value 27. Regions 7 that have lozenge-shaped limits are entered in these patterns that repeat in the half-tone printing reference patterns. Each of these pattern regions 7 is provided with the same printing values. Such a pattern region 7 can be interpreted as a picture element at the printed product whose size corresponds to the half-tone value. This means that the picture element which is printed in a pattern region is all the larger the higher the half-tone value is. These pattern regions 7 in the illustrated half-tone printing reference patterns are arranged along diagonally proceeding lines 8 that describe an angle of 45° relative to a horizontal or vertical line. This angle is referred to as a screen angle with which the picture elements generated by the half-tone printing reference pattern are arranged in the finished product. Half-tone printing reference patterns having other screen angles, for example with 30° or with 60°, are known that can be likewise employed within the scope of the inventive method.

Half-tone printing reference basic patterns form the basis for the production of the half-tone printing reference patterns in the inventive method. The half-tone printing reference basic patterns have the same shapes and arrangements as the above-described half-tone printing reference patterns, whereby a half-tone printing reference basic pattern is allocated to each reduced color value. When the reduced color values shown in FIG. 4 are employed, then there are a total of 251 half-tone printing reference basic patterns, whereby a plurality of reduced color values have the same half-tone printing reference basic pattern allocated to them, since the number of different patterns is usually smaller than the number of reduced color values. For example, there are only 33 different patterns given the half-tone printing reference patterns shown in FIGS. 7a through 7e.

The allocation ensues according to the following allocation rules:

A. When the reduced color value is an element of the standard color region and it lies in the dark region of the color curve from black up to the respectively fully saturated color of red, green, blue, cyan, magenta or yellow, then the half-tone value for the half-tone printing reference basic pattern is calculated by multiplying the color saturation level by a color constant. The half-tone value for the HLC color is 0; this means that no HLC color is printed.

B. When the reduced color value is an element of the HLC color region and when it lies in the dark region of the color curve from black to the saturated color of red, green, blue, cyan, magenta or yellow, then the half-tone value of the half-tone printing reference pattern for the standard color corresponds to the gray scale level of the reduced color value, and the half-tone value of the half-tone printing reference basic pattern for the HLC color corresponds to the color saturation level.

C. When the reduced color value lies in the HLC color region and is an element of the bright region of the color curve from one of the colors of red, green, blue, cyan, magenta or yellow to white, then the half-tone value of the half-tone printing reference basic pattern for the standard color is equal to 0, i.e. no standard color is printed, and the half-tone value of the half-tone printing reference basic pattern for the HLC color corresponds to the color saturation level of the reduced color value.

D. When the reduced color value lies in the standard color region and is an element of the bright region of the color curve from one of the colors of red, green, blue, cyan, magenta or yellow to white, then the half-tone value of the half-tone printing reference pattern for the HLC color is equal to 0, i.e. no HLC color is printed, and the half-tone value for the half-tone printing reference pattern for the standard color is calculated according to the following equation:

Half-tone value=color saturation level+(332−color saturation level)×color constant.

The color constants for the primary colors red, blue and green amount to the values 0.3 or, respectively, 0.59 or, respectively, 0.11.

The above rules A, B, C, D shall be explained below on the basis of four color points P1, P2, P3 and P4 entered in the color curve of the red color.

The color point P1 lies in the standard color region and is arranged on the dark region of the color curve between black and the fully saturated color red. Consequently, rule A is to be applied here. The color point P1 has the reduced color value 14 (RF=14), that corresponds to the RGB color value (112, 0, 0). In the color curve from saturated red to black, the individual, reduced color values are numbered with color curve values FW, whereby the fully saturated color red has the color curve value 0 allocated to it and the color black has the color curve value 16 allocated to it. The color point P1, accordingly, has the color curve value 9 (FW=9).

The gray levels have a numerical range from 0 through 32 allocated to them, whereby 0 represents the maximum darkness (=black) and 32 represents the maximum brightness (=white). The numerical range from 0 through 32 corresponds to the number of half-tone printing reference patterns. Given a different number of half-tone printing reference patterns, this numerical range is to be correspondingly normed. The gray levels GR are therefore indirectly proportional to the color curve values FW of the individual, reduced color values from 0 through 16 and can be calculated in the following way on the basis of the color curve value FW of the color point P1:

$$GR=(32/16) \times FW = 2 \times FW$$

For the color point P1 (with FW=9), thus, the gray level GR amounts to 18 (GR=18). The half-tone value of a half-tone printing reference basic pattern is then calculated by multiplying the gray level GR by the color constant FK, whereby the color constant for red is equal to 0.3, a half-tone value of 5.4 deriving therefrom that is rounded to the whole number 5. The half-tone printing reference basic pattern having the half-tone value equal to 5 is therefore allocated to the color point P1 (RF=14). The half-tone value for the HLC color amounts to 0, so that P1 for the HLC color has the half-tone printing reference pattern with the half-tone value 0 allocated to it, i.e. the half-tone printing reference pattern whose printing values are all equal to 0.

The color point P2 lies within the HLC color region and is arranged between the fully saturated color red and the color black (dark region). Rule B thus applies here. The color point P2 comprises the color curve value FW=3 on the color curve scale shown in FIG. 2. The gray level GR that is calculated with the equation to rule A for the color point P2 thus amounts to the value 6. The color saturation level FS of the point P2 is indirectly proportional to the gray level thereof and, accordingly, can be calculated according to the following equation:

$$FS = 32 - GR$$

For the point P2, thus, the color saturation level FS is equal to 26. The half-tone value of the half-tone printing reference basic pattern for the standard color corresponds to the gray level (GR=6), and the half-tone value of the half-tone printing reference basic pattern for the HLC color corresponds to the color saturation level (FS=26), so the half-tone printing reference basic pattern with corresponding half-tone values is allocated to the color point P2 for the standard color or, respectively, for the HLC color.

The color point P3 lies in the HLC color region and is arranged between the fully saturated color red and the color white (bright region). Accordingly, Rule C is to be applied to color point P3. In this region of the color curve from the fully saturated color to white, too, the individual, reduced color values are numbered with the color curve values FW from 0 through 16. The point P3 has the color curve value FW equal to 2 that corresponds to the reduced color value (RF=24) and to the RGB color value (255, 32, 32). The color saturation level can again assume values between 0 and 32 since it is normed onto the region of the half-tone values of the half-tone printing reference pattern, and the color saturation level is indirectly proportional to the color curve values in the bright region of the color curves, and since the color white has the color saturation value 0 allocated to it and the maximally saturated color red has the color saturation value 32 allocated to it. The color saturation value FS is therefore calculated according to the following equation:

$$FS = 32/16 \times (16-FW) = 2 \times (16-FW)$$

A color saturation value of 28 therefore derives for the color curve value equal to 2. Since the color saturation value corresponds to the half-tone value of the half-tone printing reference basic pattern for the HLC color, the half-tone printing reference basic pattern having the half-tone value equal to 28 is allocated to the point P3 for the printing the HLC color. The half-tone value of the half-tone printing reference pattern for the standard is equal to 0, for which reason the corresponding half-tone printing reference pattern is allocated to the color point P3.

The color point P4 lies in the standard color region and is arranged between the fully saturated color red and the color white in the bright region of the color curve. Accordingly, Rule D applies to point P4. The color point P4 has a color curve value of 7 (FW=7), a reduced color value of 29 (RF=29) that corresponds to an RGB color value of (255, 112, 112).

The color saturation level FS is calculated as in the case of Rule C, for which reason a color saturation level FS of 18 (FS=18) follows for the color curve value of 7. The calculation of the half-tone value of the half-tone printing reference basic pattern for the standard color ensues according to the equation recited above for Rule D into which the color saturation level and the color constant for the color red are to be inserted. A half-tone value of 22.2, which is rounded to 22, derives. The color point P4 thus has the half-tone printing reference basic pattern for the standard color with the half-tone value 22 allocated to it. For the HLC color, the half-tone printing reference basic pattern with the half-tone value equal to 0 is allocated to the point P4.

These rules have the following physical background:

In a dark region of the color curves, i.e. in the region extending from the fully saturated color up to black, the individual colors are composed of a gray part and of a chromatic part. With Rule B, the gray part is allocated to the standard color and the chromatic part is allocated to the HLC color. With Rule A, both the gray part as well as the chromatic part are allocated to the standard color, whereby the color part causes a brightening that is taken into consideration with the color constant.

Rules C and D apply in the bright region of the color curve. In this region, the colors are composed only of the chromatic part. There is no gray part. This chromatic part is completely allocated to the HLC color according to Rule C.

Given additive colors, the different color saturation levels of a color of the bright regions are represented by the full color saturation of the corresponding color and a white part that brightens the color. The color curve for the color red in the bright color region is shown in FIG. 4 in the region of the reduced color values RF from 23 through 37, whereby the primary color red has the maximum value of 255 allocated to it, and the further primary colors green and blue have increasingly higher values allocated to them with increasing brightness of the color. The equation for calculating the half-tone value of the half-tone printing reference pattern of the standard color therefore takes into consideration, first, the color saturation level in and of itself and, second, the chromatic part minus the white part, which is then weighted with the color constant. In the RGB color space, the above-described point P4 is represented by the RGB color value of (255, 112, 112). This, thus, has a chromatic part minus the white part of (143, 0, 0) and has a white part of (112, 112, 112).

Two tables having half-tone printing basic patterns are produced on the basis of the above-explained allocation rules. One table is provided for that case wherein the reduced color values to which the half-tone printing reference basic patterns are allocated are assigned to the standard color, and the other table is for that case wherein the reduced color values to which the half-tone printing reference basic patterns are allocated, are assigned to the HLC color. The table of the color values allocated to the standard color comprises a half-tone printing reference basic pattern for each reduced color value for printing the standard color and one for printing the HLC color. According to the rules A and D, these half-tone printing referenced basic patterns are allocated to the reduced color values. For every reduced color value, the table of the color values allocated to the HLC color comprises a half-tone printing reference basic pattern for printing the standard color and one for printing the HLC color. Corresponding to Rules B and C, these half-tone printing reference basic patterns are allocated to the reduced color values.

Figure 5:
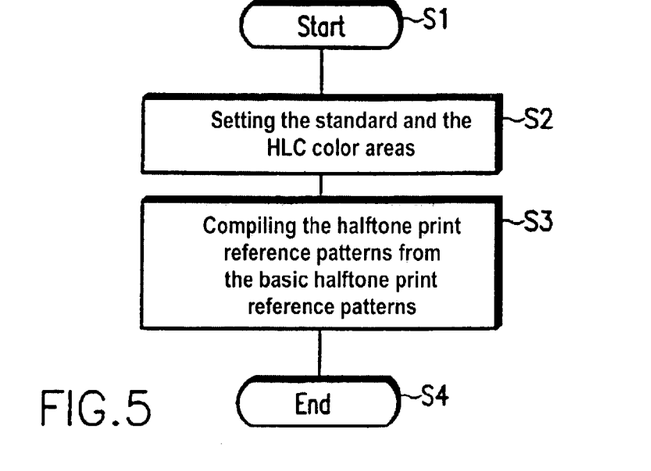
FIG. 5 is a flow chart showing a method for producing half-tone printing reference patterns for the HLC color printing.
Figure 6:
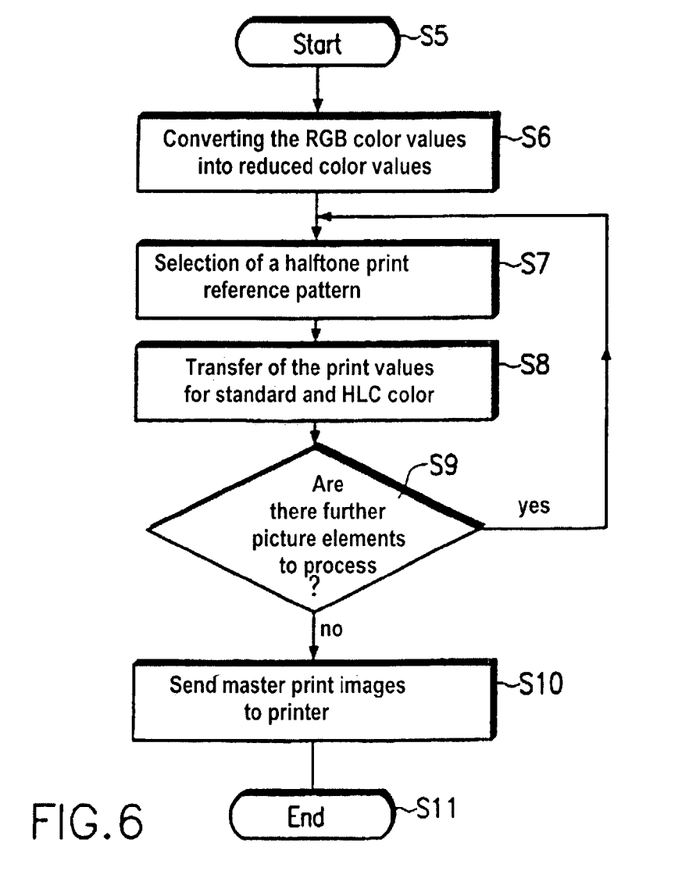
FIG. 6 is a flow chart showing a method for printing an HLC image by means of the half-tone printing reference pattern generated according to the method shown in FIG. 5.
Figure 7A:
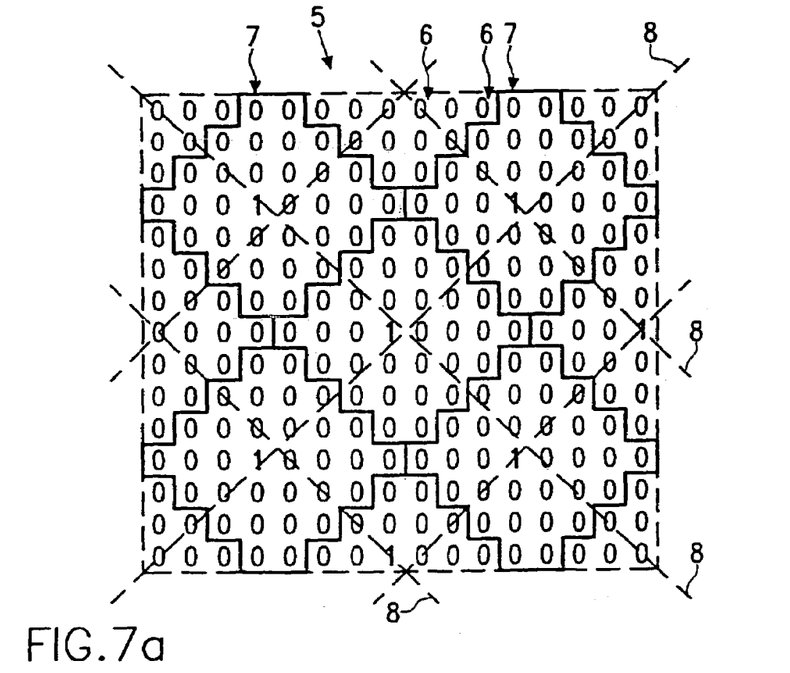
FIGS. 7a–7e are enlarged views showing respective excerpts from a half-tone printing reference pattern.
Figure 7B:
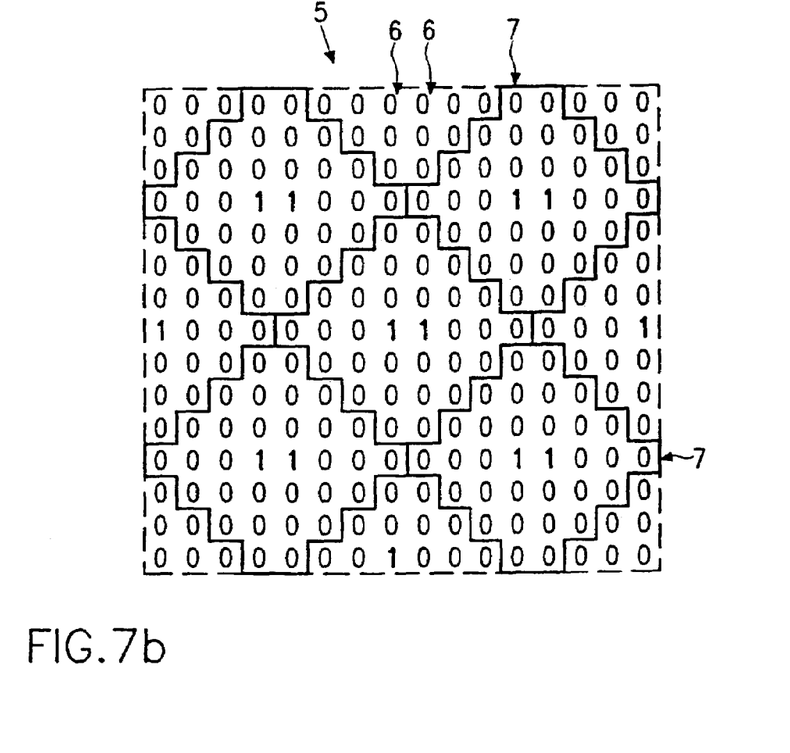
Figure 7C:
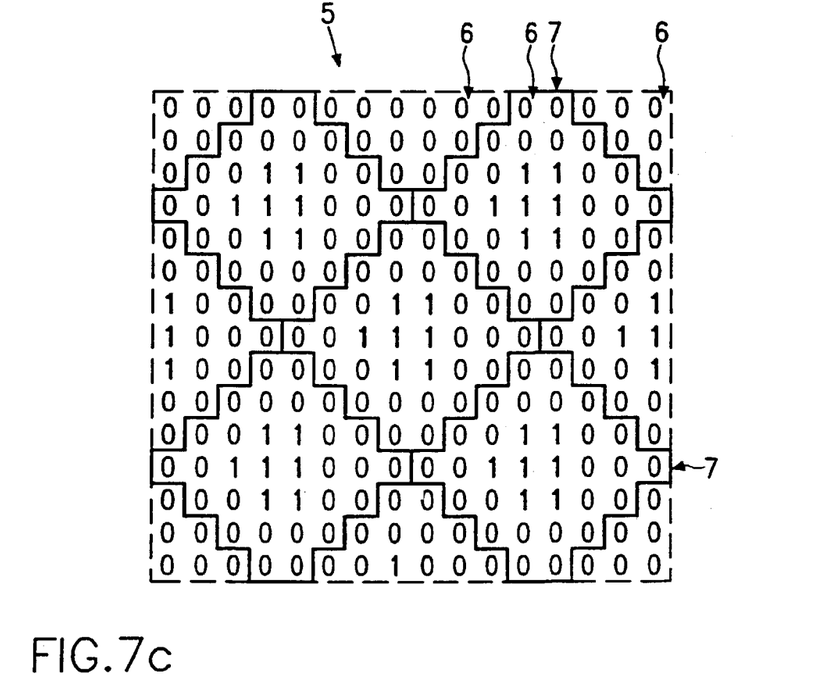
Figure 7D:
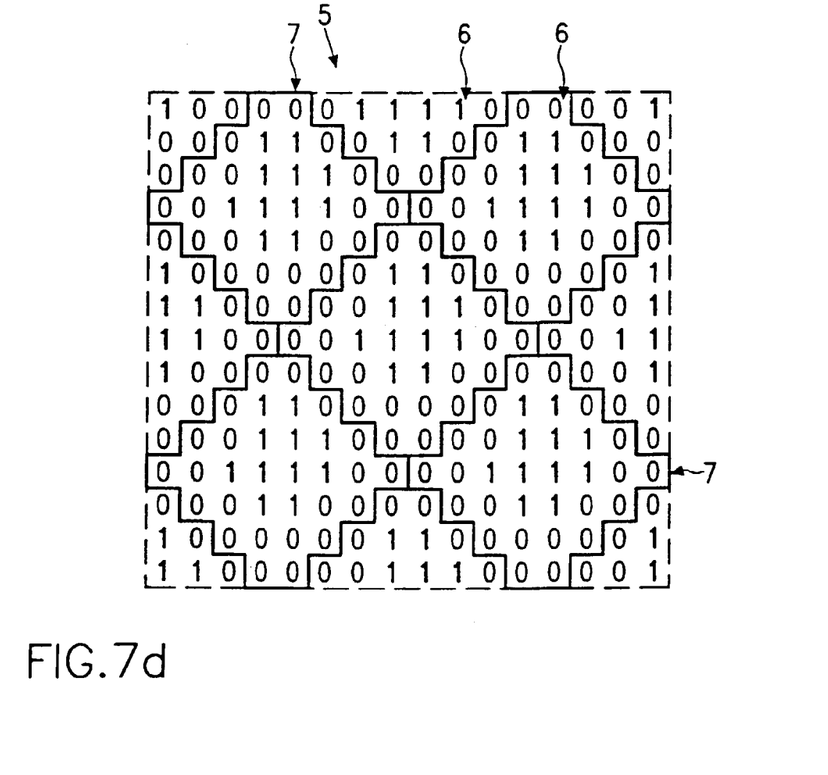
Figure 7E:
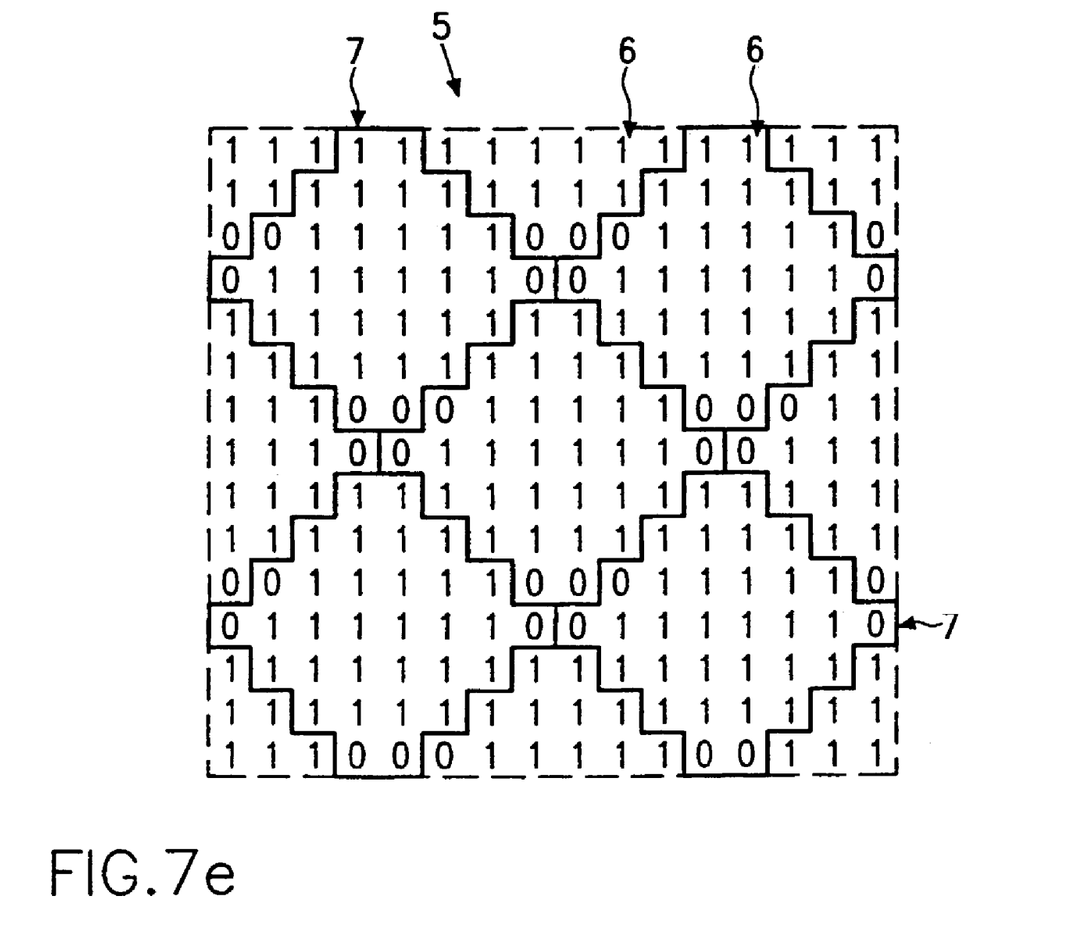

The inventive method begins with Step S1 (see FIG. 5). In Step 2, the standard color regions and the HLC color regions are first selected. This can ensue, for example, on the basis of mechanical shift devices for the color curves of the colors red, green, blue, cyan, magenta and yellow. Given these shift devices, respectively two slides are provided that serve the purpose of defining the boundary of the HLC color region that lies between the two slides. The other regions of the color curves represent the standard color regions. Instead of mechanical slides, the color curves can also be displayed at a picture screen of a computer, corresponding selection markings 3 and 4 being then place there with, for example, a computer mouse.

In the following Step S3, the corresponding half-tone printing reference basic patterns are allocated (according to Rule B or, respectively, C) to the reduced color values that lie within the HLC color region, whereas the corresponding half-tone printing reference basic patterns are allocated (according to Rule A and D) to the reduced color values of the standard color regions. The method for producing the tables has ended with Step S4.

According to the above rules A through D, two tables having pairs of half-tone printing reference patterns are produced, whereby each table comprises a pair of half-tone printing reference basic patterns for each reduced color value. The one table comprises all half-tone printing reference basic patterns for the standard color region, and the other table comprises all half-tone printing reference basic patterns for the HLC color region. The tables for the standard color region and for the HLC color regions as well as the table that contains the allocation of the RGB colors to reduced colors (FIG. 4) can be produced once in advance and can be permanently stored as base data for the inventive method.

When the inventive table of the half-tone printing reference patterns has been produced dependent on the selection of the standard color regions and of the HLC color regions, then the method shown in FIG. 9 can be implemented for printing an HLC image. This method begins with the Step S5. In Step S6, a master image 1 that is described with color values of the RGB color space is reduced to a master image 2 whose picture elements BP are described with the reduced color values. In Step S7, a half-tone printing reference pattern for the standard color and a half-tone printing reference pattern for the HLC color are selected for a picture element on the basis of the reduced color value.

In the following Step 8, the printing value of the half-tone printing reference pattern for the standard color allocated to the respective picture element BP and the printing value of the half-tone printing reference pattern for the HLC color allocated to the respective picture element are accepted and are stored instead of the picture element in a print master image 9 (FIG. 3) for the standard color or, respectively, in a print master image for the HLC color.

In Step S9, a check is carried out to see whether further picture elements of the master image are to be processed. When this is the case, then the processing returns to Step S7, so that the Steps S7 and S8 are implemented for the further picture element. When the query in Step S9 shows that all picture elements have been processed, then the program execution switches to Step S10 with which the print master images 9 are sent to the printer, as a result whereof the printing process is implemented for the standard color and for the HLC color. The procedure has ended with Step S11.

The above exemplary embodiment shows that, due to the integration of the standard color regions and of the HLC color regions into the half-tone printing reference pattern, the method for printing an HLC image is reduced to merely the selection of two half-tone printing reference patterns and the transfer of the corresponding printing values. The standard interrogation of all picture elements of the prior art as to whether they lie in the standard color region or in the HLC color region and the corresponding conversion into gray levels suitable for a dither process can thus be eliminated. In the present invention, by contrast, the dither method and the generation of the print commands for the HLC color and the standard color are implemented simultaneously as a result of the selection of the half-tone printing reference pattern.

The invention has been described above on the basis of an exemplary embodiment for a digital printing having only two printing levels (no color saturation and full color saturation). The inventive method, however, can also be modified without further ado for a multi-level printer (providing multi-level printing) that can print an output pixel in a plurality of color saturation levels. Given such a modification, the individual printing values of the half-tone printing reference pattern can assume a plurality of different values that corresponding to the individual printing levels.

It is also possible within the framework of the invention to combine the half-tone printing reference patterns for the standard color and the half-tone printing reference patterns for the HLC color in a combined half-tone printing reference pattern, whereby it contains two printing values at each field element, one for the standard color and one for the HLC color. With such combined half-tone printing reference patterns, only a single half-tone printing reference pattern is allocated to each reduced color value, and only a single half-tone printing reference pattern then need be selected in the selection Step S7. As a result thereof, the processing time of implementing the inventive method can be optimized further.

In summary, it can be stated again: the invention employs half-tone printing reference patterns (reference dither matrices) for generating printing values for a print master image for a standard color (for example, black) and for a print master image for an HLC color (for example, red). In the half-tone printing reference patterns (combined dither matrices), the color information with respect to a standard color region (whose color values are mapped, for example, onto black) and an HLC color region (whose color values are mapped, for example, onto red) are integrated. The outlay to be exerted in this method in the generation of print drive values is thereby limited to the selection of the corresponding half-tone printing reference pattern and the transfer of the printing value recited in the half-tone printing reference pattern. The formation of the print control values can thus be implemented relatively simply and quickly. For each picture element, only a corresponding selection for determining the printing values for the standard color and for the HLC color need be implemented. Color pallets can be advantageously utilized with the invention. A high-resolution color image value, for example a 24-bit deep color value represented in the RGB color space, is thereby mapped onto a pallet having little bit depth, for example onto a pallet that is only 8 bits deep. The pallet is then composed of 251 pallet entries, i.e. the pallet points or, respectively, the pallet indices allocated to them represent a sub-set of the RGB color space. With the invention, the half-tone printing reference patterns in the HLC space and in the standard color space can be driven by a common pallet index. As a result of this common addressing of both color separations via the same pallet index, it is also possible to simultaneously process both color separations. The inventive method can thus be implemented significantly more simply and faster than known, other methods for printing an HLC image.

The number of simultaneously implemented processing events for dithering a plurality of color separations is dependent on the bit width of the registers that are available. Given registers with a width of 32 bits, for example, up to four separations having a depth of 8 bits can be simultaneously processed or, alternatively, up to eight color separations having a bit depth of four can be simultaneously processed. Given registers having a bit width of 64, correspondingly more parallel procedures are possible.

In a development of the invention, the addressing for every arbitrary pallet can be undertaken via the pallet index, whereby the pallet contains an arbitrary limited sub-region of the entire color space (for example, RGB or YMCK). Such a limited color space is, for example, extremely useful in the reproduction of graphics such as bar diagrams, whereby, for example, sixteen different colors—i.e. a pallet having only four bits—can be offered in a diagram 16, these having a high color or, respectively, brightness contrast relative to one another when printing with two colors (standard color and HLC) and, thus, having a high capability of being distinguished from one another. In this developed version, an even more limited number of half-tone printing basic patterns and half-tone printing reference patterns can be employed and, thus, the processing speed can be enhanced further.

The inventive method can be realized as a computer program that can be implemented in a computer that drives a printer. The computer program representing the inventive method can be stored in the computer and/or on a data carrier. It can be realized as what is referred to as a computer program product such as, for example, a data carrier (such as a CD-ROM) or as some other collection of computer data files that, for example, are transmitted via download over the Internet.

In many applications, the HLC color and the standard color are printed in different regions on the printed sheet. In such applications, the same types of half-tone printing reference patterns can be employed, i.e. half-tone printing reference patterns having the same raster structure and the same screen angle can be employed. Given applications wherein the standard color and the HLC color are printed in the same regions on the printed sheet, it is meaningful in order to avoid Moiré effects to employ different types of half-tone printing reference patterns that, for example, differ in terms of the screen angle. For example, it is expedient to employ a half-tone printing reference pattern having a screen angle of 30° for the standard color and to employ a screen angle of 60° for the HLC color or vice versa.

It is also possible within the framework of the invention that two or more HLC colors are printed in addition to the standard color, whereby a separate HLC color region is defined for each HLC color and a set of half-tone printing reference patterns is determined for each HLC color.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for printing a highlight color image according to image data, each image datum describing a color value of a picture element of a master image, and color values of specific standard color regions being allocated to a standard color to be printed and color values of specific highlight color regions being allocated to a highlight color to be printed, comprising the following steps for determining printing values for driving a printer for each picture element to be printed:
   a) producing half-tone printing reference patterns for the standard color and the highlight color from half-tone printing reference basic patterns, and
      providing a table having said half-tone printing reference basic patterns for the specific standard color regions and a further table with said half-tone printing reference basic patterns for the specific highlight color regions;
      aa) allocating said half-tone printing reference basic pattern for the standard color as well as said half-tone printing reference basic pattern for the highlight color from said table for the standard color to each color value allocated to the standard color;
      ab) allocating said half-tone printing reference basic pattern for the standard color as well as said half-tone printing reference basic pattern for the highlight color from said table for the highlight color to each color value allocated to the highlight color as a respective said half-tone printing reference pattern;
   b) selecting said half-tone printing reference pattern for the respective picture element for the standard color, said selecting of said half-tone printing reference pattern being performed according to a criterion of the color value of the respective picture element;
   c) selecting said half-tone printing reference pattern for the respective picture element for the highlight color, said selecting of the half-tone printing reference pattern being performed according to said criterion of the color value of the respective picture element;
   d) determining said printing value for the standard color and said printing value for the highlight color for the respective picture element from the corresponding half-tone printing reference pattern, and
      storing said printing values at a location of the picture elements in a print master image for the standard color and in a print master image for the highlight color; and
   e) transmitting said print master images to the printer for printing the standard color and for printing the highlight color.

2. A method for printing a highlight color image according to claim 1, further comprising the step of:
   allocating groups of similar ones of said color values to a reduced color value, and
   employing said reduced color values as said color values that are respectively allocated to said half-tone reference pattern for the standard color and said half-tone reference pattern for the highlight color.

3. A method for printing a highlight color image according to claim 2, further comprising the step of:
   allocating said color values to said reduced color values to which they are closest in Euclidean terms.

4. A method for printing a highlight color image according to claim 1, further comprising the steps of:
   merging said printing values for the standard color and said printing values for the highlight color in combined half-tone reference patterns; and
   allocating said printing value for the standard color and said printing value for the highlight color to each position of said half-tone reference pattern, as a result whereof both said printing value for the standard color as well as said printing value for the highlight color are determined in a single selection step.

5. A method for printing a highlight color image according to claim 1, wherein the half-tone reference patterns define a screen angle, and further comprising the step of:
   providing said screen angle of said half-tone reference pattern for printing the standard color at a different screen angle from said half-tone reference pattern for printing the highlight color.

6. A method for printing a highlight color image according to claim 1, wherein the standard color is black.

7. A method for printing a highlight color image according to claim 1, wherein said half-tone reference basic patterns are respectively allocated to said color values that describe a pure color selected from the group consisting of: red, green, blue, cyan, magenta and yellow.

8. A method for printing a highlight color image as claimed in claim 7, wherein said color values include a gray part.

9. A method for printing a highlight color image according to claim 7, wherein said half-tone reference basic patterns for said color values of the specific standard color regions are allocated according to the following rules:
   when said color value lies in a dark region of a color curve from black up to a respectively fully saturated color, then calculating a half-tone value allocated to said half-tone printing reference basic pattern by multiplying a color saturation level by a color constant, and allocating to said color value said half-tone printing reference basic pattern with said half-tone value for printing the standard color and for printing the highlight color with said half-tone value equal to zero;
   when said color value lies in a bright region of said color curve from said fully saturated color to white, then said corresponding half-tone value includes said color saturation level and a value indirectly proportional to said color saturation level multiplied by said color constant, and allocating to said color value said half-tone printing reference basic pattern with said half-tone value for printing the standard color and with said half-tone value zero for printing the highlight color.

10. A method for printing a highlight color image according to claim 7, wherein said half-tone printing reference basic patterns are allocated to said color values of the specific highlight color regions according to the following rules:

when said color value lies in a dark region of a color curve from a color black to said respectively fully saturated color, then said half-tone value of said half-tone printing reference pattern for printing the standard color corresponds to a gray scale level of said reduced color value, and said half-tone value of said half-tone printing reference basic pattern for the highlight color corresponds to said color saturation level; and when said color value lies in a bright region of said color curve from a fully saturated color to a color white, then said half-tone value of said half-tone printing reference basic pattern for printing the standard color is equal to zero, and said half-tone value of said half-tone printing reference pattern for printing the highlight color corresponds to said color saturation level of said color value.

11. A method for printing a highlight color image according to claim 1, further comprising the steps of:

printing at least two highlight colors in addition to the standard color;

defining a separate highlight color region for each highlight color; and determining a set of said half-tone printing reference patterns for each of said at least two highlight colors.

* * * * *